United States Patent
Gandhi et al.

(10) Patent No.: US 12,250,492 B2
(45) Date of Patent: *Mar. 11, 2025

(54) METHOD AND APPARATUS FOR REDUCING INTERFERENCE FROM CONTENT PLAY IN MULTI-DEVICE ENVIRONMENT

(71) Applicant: Adeia Guides Inc., San Jose, CA (US)

(72) Inventors: Gaurav Gandhi, Bengaluru (IN); Kuppappa Dandappa Harijan, Bengaluru (IN); Siddhartha Pande, Bengaluru (IN); Deviprasad Punja, Bangalore (IN); Madhusudhan Srinivasan, Bangalore (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,776

(22) Filed: Mar. 27, 2023

(65) Prior Publication Data

US 2023/0247173 A1 Aug. 3, 2023

Related U.S. Application Data

(63) Continuation of application No. 17/511,918, filed on Oct. 27, 2021, now Pat. No. 11,641,444, which is a continuation of application No. 16/907,754, filed on Jun. 22, 2020, now Pat. No. 11,190,727, which is a continuation of application No. 16/525,364, filed on Jul. 29, 2019, now Pat. No. 10,728,493.

(51) Int. Cl.
*H04N 5/911* (2006.01)
*H04R 3/00* (2006.01)
*H04R 29/00* (2006.01)

(52) U.S. Cl.
CPC ............... *H04N 5/911* (2013.01); *H04R 3/00* (2013.01); *H04R 29/004* (2013.01)

(58) Field of Classification Search
CPC ......... H04N 5/911; H04R 3/00; H04R 29/004
See application file for complete search history.

(56) References Cited

U.S. PATENT DOCUMENTS

| | | | |
|---|---|---|---|
| 10,728,493 B1 * | 7/2020 | Gandhi | .................... H04R 3/00 |
| 10,825,480 B2 | 11/2020 | Marco et al. | |
| 11,190,727 B2 * | 11/2021 | Gandhi | ................ H04R 29/004 |
| 11,641,444 B2 * | 5/2023 | Gandhi | .............. H04N 21/2407 |
| | | | 386/200 |
| 2006/0225561 A1 | 10/2006 | Kobayashi et al. | |
| 2021/0019991 A1 | 1/2021 | Marks | |
| 2021/0037206 A1 | 2/2021 | Gandhi et al. | |
| 2022/0053161 A1 | 2/2022 | Gandhi et al. | |

* cited by examiner

*Primary Examiner* — Girumsew Wendmagegn
(74) *Attorney, Agent, or Firm* — Haley Guiliano LLP

(57) ABSTRACT

Systems and methods for reducing interference between content play and video recording among multiple devices located proximate to each other. Microphones of devices recording video are muted, or content play is interrupted, according to the actions of a majority of nearby devices. For example, if most devices are recording video, content play may be interrupted to prevent the video from unintentionally recording unwanted sounds from play of the content. Conversely, if most devices are not recording video, only those devices which are may have their microphones muted. Actions to reduce interference may be taken according to the current behavior of a majority of proximate devices.

20 Claims, 6 Drawing Sheets

METHOD AND APPARATUS FOR REDUCING INTERFERENCE FROM CONTENT PLAY IN MULTI-DEVICE ENVIRONMENT

CROSS-REFERENCE TO RELATED APPLICATIONS

This application is a continuation of U.S. patent application Ser. No. 17/511,918, filed Oct. 27, 2021, which is a continuation of U.S. patent application Ser. No. 16/907,754, filed on Jun. 22, 2020, now U.S. Pat. No. 11,190,727, which is a continuation of U.S. patent application Ser. No. 16/525,364, filed Jul. 29, 2019, now U.S. Pat. No. 10,728,493, the disclosures of which are hereby incorporated by reference herein in their entireties.

BACKGROUND

Embodiments of the disclosure relate generally to electronic media entertainment systems. More specifically, embodiments of the disclosure relate to electronic media entertainment systems for reducing interference from content play in multi-device environments.

SUMMARY

The wide availability and selection of digital content, combined with the large number of electronic devices available for its playback, allows users great flexibility in where and how they may consume content. This flexibility has its limitations, however. For example, when several users are playing and recording content within the same area, the potential for interference may arise. In particular, content being played by some users may add unwanted background noise to recordings being made by other nearby devices. In such situations, devices playing audible content may be muted to reduce audio interference with other devices that are recording audio. This itself raises a number of problems though, including inconveniencing others nearby who wish to hear the audible content.

Accordingly, to overcome the problems and limitations of current solutions to the problem of conflicts between different users playing and recording content within the same area, systems and methods are described herein for a computer-based process that determines whether a device currently playing content is also recording audio or not, and controls it and other devices accordingly in order to reduce audio interference between such devices. As one example, if a device is currently playing content but also recording audio, such as when a user in a vehicle is streaming content to the vehicle's speakers but is also making a video recording, various actions can be taken to reduce interference between nearby devices according to the actions of a majority of nearby devices. For instance, if a majority of nearby users are not recording audio, the device streaming content to the vehicle may be allowed to continue, as this audio signal will not interfere with most other devices. Conversely, if a majority of nearby users are recording audio, the content stream may be muted or paused. In this manner, audio interference may be reduced for most nearby users.

In other words, to overcome the problems and limitations of devices when multiple such devices are playing and recording content within the same area, systems and methods are described herein for a computer-based process that determines whether a device is both requesting play of content and recording video, such as when a device in a vehicle is both streaming content to the vehicle's speakers and simultaneously making a video recording. If a device is requesting play of content, its microphone is muted or the streaming content is interrupted according to whether the device is recording video or not, and according to whether a majority of other nearby devices are also recording video.

As one example, when a device in a vehicle is both streaming content to the vehicle's speakers and simultaneously making a video recording, and less than a majority of other devices in the vehicle are recording video, the streaming device's microphone can be muted. That is, it can be assumed that most users wish to continue listening to the streamed content, since they are not taking video. The streamed content is allowed to continue, with the streaming device's microphone muted so that the content audio does not interfere with the device's video recording. Similarly, the minority of devices that are recording video may also have their microphones muted so that the content audio does not interfere with their video recordings.

As another example, when a device in a vehicle is both streaming content to the vehicle's speakers and simultaneously making a video recording, and a majority of other devices in the vehicle are recording video, the streaming content can be muted, paused, or otherwise interrupted. In this case, most users in the vehicle are recording video and thus may wish to avoid audio interference. The streamed content is thus paused, muted, or otherwise interrupted to accommodate the majority of users. Content play may be unmuted or resumed when each device, or each device besides the one streaming content, has finished recording video.

When the device playing content is not recording video and fewer than a majority of the other nearby devices are recording video, content play can continue, as most users are not recording video and are thus deemed to wish to continue listening to content. The minority of devices that are recording video may have their microphones muted, to reduce or eliminate audio interference in their video recordings.

Conversely, if the device playing content is not recording video but a majority of the other nearby devices are recording video, the content can be paused or muted so that it is not picked up by those devices currently recording video. Content play may be unmuted or otherwise resumed when each device, or each device besides the one streaming content, has finished recording video.

While the above description utilized devices within a vehicle as an example, it should be noted that interference-reducing processes of this disclosure can be carried out in other contexts as well. Indeed, the methods carried out herein may be applied to reduce audio interference between devices in any location or context in which such interference may occur. For example, they may be applied to devices located within a building or any other structure, such as in the case of multiple devices within the same room of a dwelling.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for reducing interference between content play and video recording among multiple devices located in proximity to each other. Microphones of devices recording video are muted, or content play is interrupted, according to the actions of a majority of nearby devices. For example, if most devices are recording video, content play may be interrupted to prevent the video from unintentionally recording unwanted sounds from play of the content. Conversely, if most devices are not recording video, only those devices which are may have their microphones muted. These and other actions may be taken according to the current behavior of a majority of nearby devices.

Figure 1:
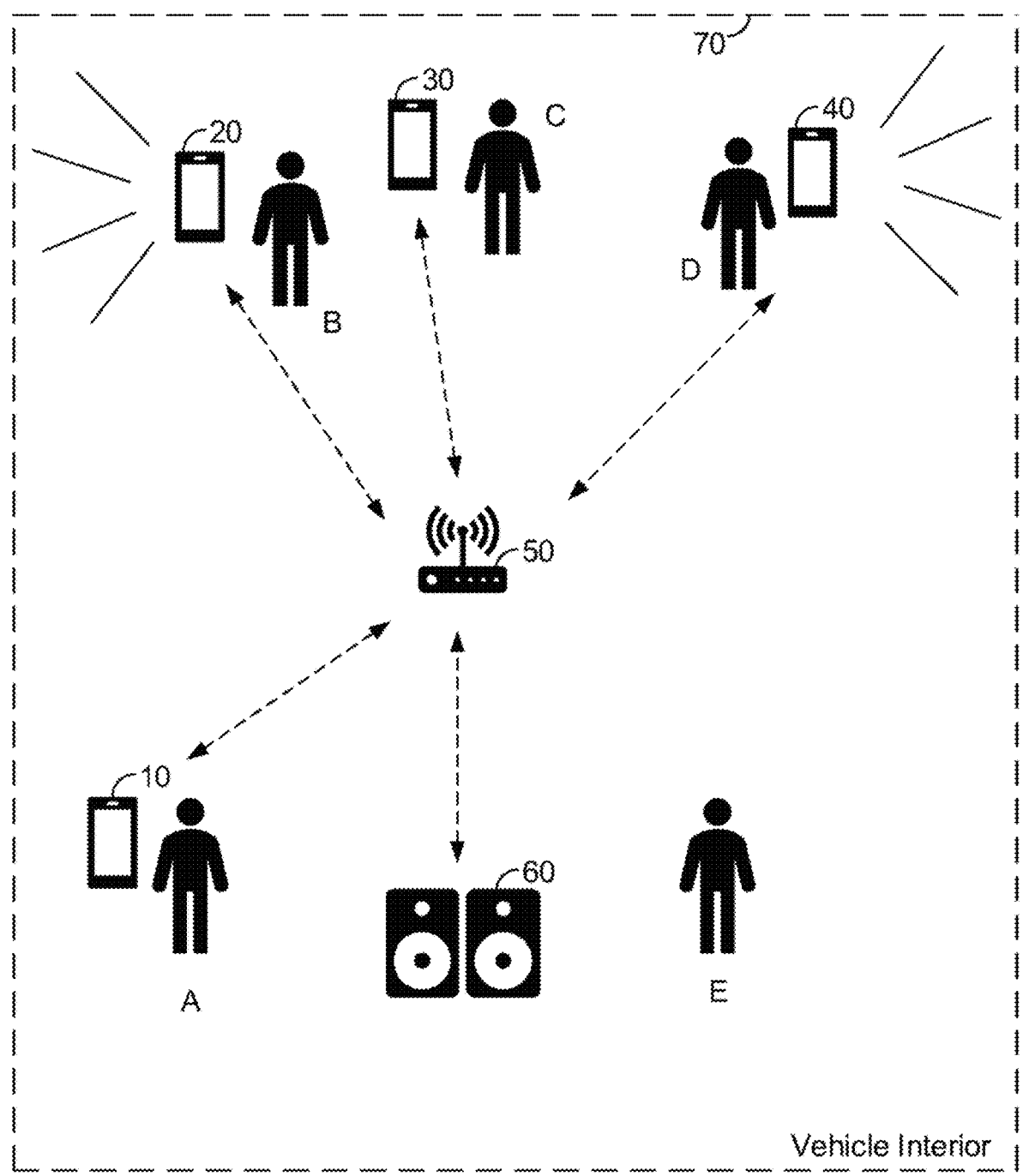
FIG. 1 illustrates an exemplary environment for reducing interference from content play in multi-device environments, in accordance with embodiments of the disclosure.

FIG. 1 illustrates an exemplary environment for reducing interference from content play in multi-device environments, in accordance with embodiments of the disclosure. Here, a first device 10 and a number of second devices 20, 30, 40 are each in electronic communication with a content direction device 50, which is in turn in electronic communication with audio speakers 60. The devices 10, 20, 30, and 40 are associated with users A, B, C, and D respectively. In this example, users A-D and devices 10-60 are each within a vehicle interior 70 along with a driver E. Content direction device 50 and speakers 60 may be components integrated into the vehicle, or may be components separately placed in the vehicle by, for example, one of the passengers A-E.

In operation, the content direction device 50 is in electronic communication with each device 10-40 to direct content and control various functions thereof. One device, e.g., device 10, may play content such as music via content direction device 50 to the speakers 60, so that passengers A-E may collectively listen to music being played throughout the vehicle interior 70. Device 10 may itself stream its content to content direction device 50, where it is forwarded to speakers 60 for play. Alternatively, device 10 may request content direction device 50 to retrieve content, either from a local storage or from a remote content provider via a wireless connection over a communications network.

Content direction device 50 controls devices 10-40 and speakers 60 to prevent or reduce audio interference with devices 10-40 that are recording video or other content that may pick up audio from speakers 60. As one example, content direction device 50 can determine whether device 10 is both streaming or otherwise directing content to speakers 60, and whether a majority of devices 20-40 are currently recording video. If both conditions are true, content direction device 50 may mute microphones of those devices 10-40 that are recording video, to reduce or eliminate audio interference from speakers 60, i.e., to ensure that video recorded by devices 10-40 does not pick up undesired sounds from speakers 60.

Figure 2:
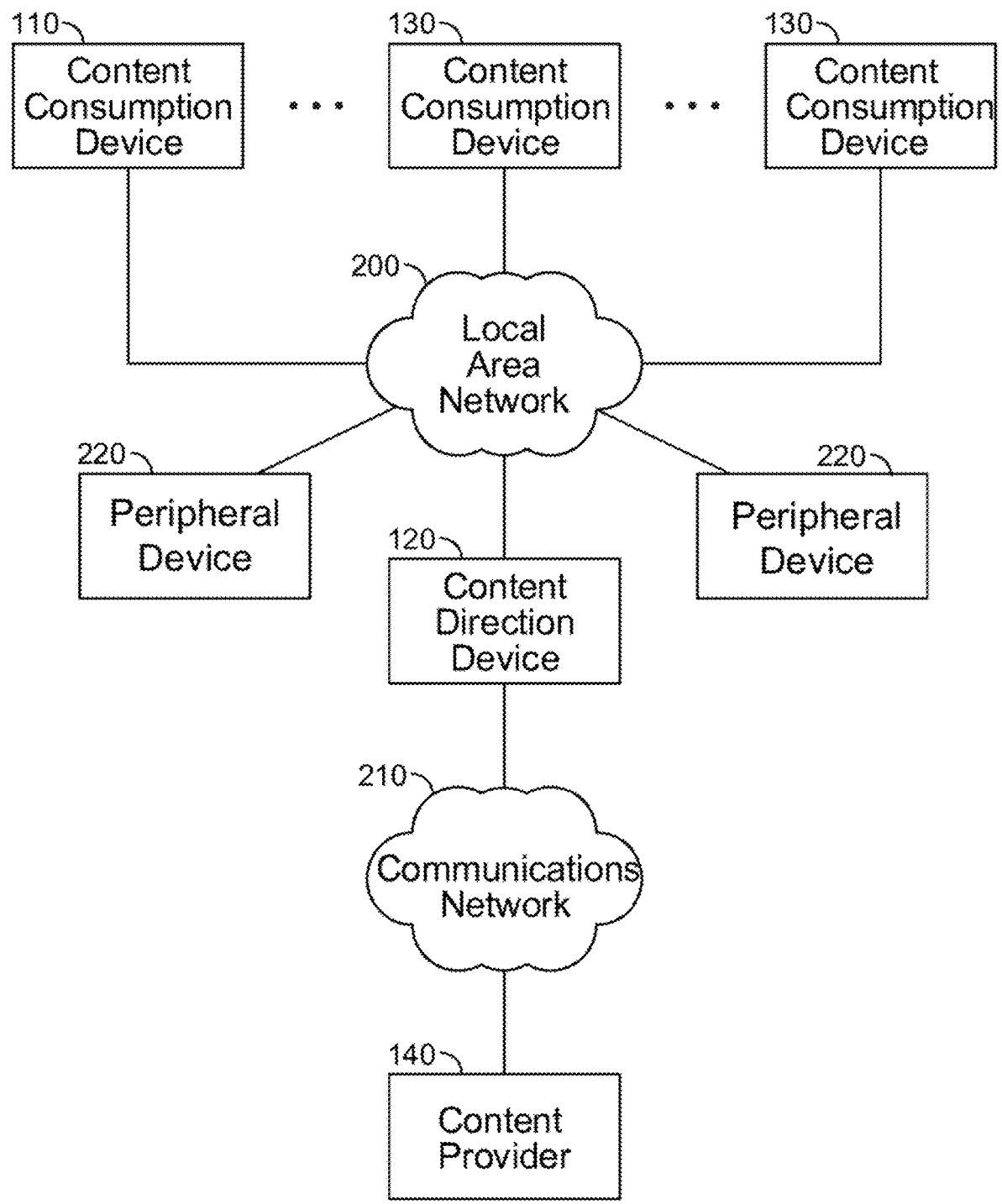
FIG. 2 is a block diagram illustration of a system for implementing the process of FIG.

FIG. 2 is a block diagram representation of a system for implementing the environment of FIG. 1, presented for further illustration. Any number of content consumption devices 110 and 130 may be in communication with content direction device 120 through, for example, a local area network 200. Here, content consumption device 110 may correspond to device 10, while content consumption devices 130 may correspond to devices 20-40. Any number of content consumption devices 130 and corresponding devices 20-40 is contemplated.

The content direction device 120, which corresponds to content direction device 50, is shown as being in electronic communication with content provider 140 through communications network 210. Alternatively, content direction device 50 may be a stand-alone device that is not connected to any communications network 210 but is instead only in communication with devices 10-40, 60 via direct wireless connection or via local area network 200. Content direction device 120 may also be in electronic communication with any number of peripheral devices 220 which can be any electronic devices capable of communication with content direction device 120. Such peripheral devices can include speakers 60, storage devices for storage of content, or any other electronic device. The peripheral devices 220 are shown as being in communication with content direction device 120 through local area network 200, but may also or alternatively be in electronic communication with device 120 by any direct wired or wireless connection.

As one example, the content consumption devices 110 and 130, local area network 200, and content direction device 120 may all be situated within a local area, e.g., within the same vehicle, or within various rooms of a home or office. The content provider 140 may be a remotely located server at a content provider site, and the communications network 210 may be the public Internet. Alternatively, the content provider 140 may be situated within the local area and may be, for example, a local content storage and streaming application on a local computer including any of the above computing devices, or even a storage and display application within the content direction device 120 itself. Multiple content providers 140 may be in communication with content direction device 120 through communications network 210. Content devices 10, 20 may be examples of content consumption devices 110, 130, and content direction device 30 may be an example of content direction device 120.

A user may be watching a show or playing other content on first content consumption device 110, at which point the content provider 140 is providing a stream of the show or other content through communications network 210 to content direction device 120. The content direction device 120 in turn receives this stream and directs it to device 110 over local area network 200. When another user requests another show or other stream on one of the second content consumption devices 130, the content direction device 120 receives the stream from one content provider 140 and directs the stream to the second content consumption device 130. In this manner, content may be streamed to multiple different devices 110, 130. The content direction device 120 also monitors and controls its various other devices as above, to reduce audio interference in recorded content.

Figure 3:
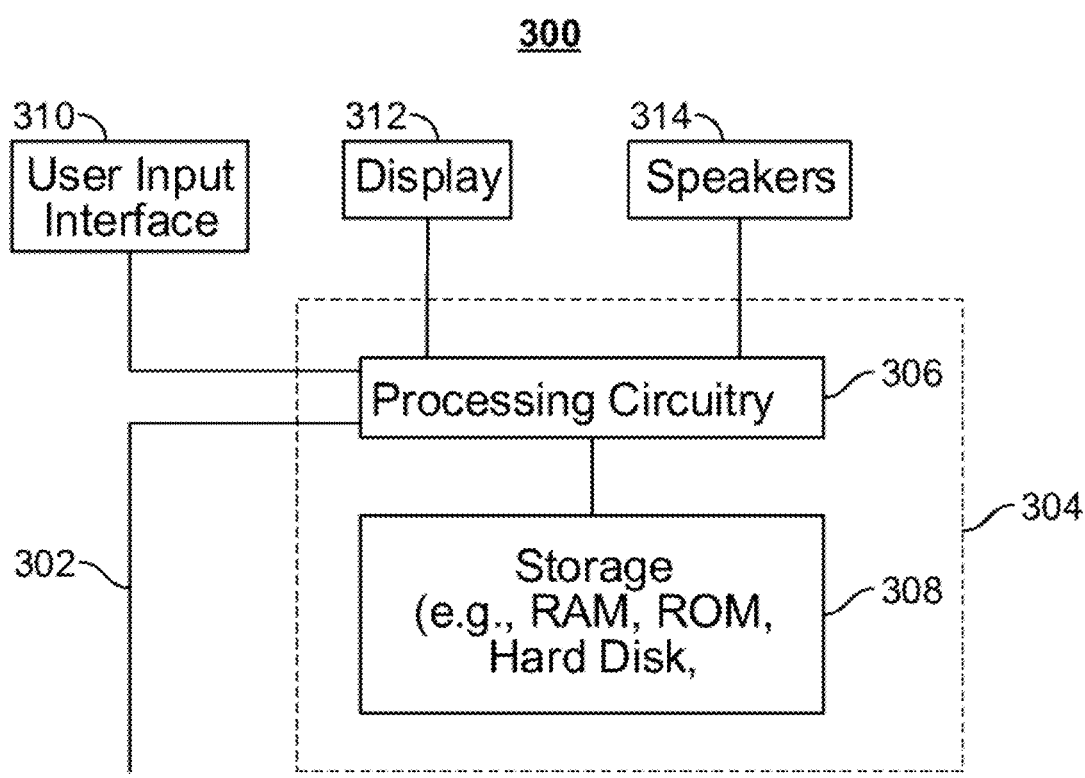
FIG. 3 is a generalized embodiment of illustrative content consumption devices constructed for use according to embodiments of the disclosure.

The content consumption devices 110, 130, e.g., devices 10, 20, may be any devices capable of receiving streamed content and displaying the content for users. For example, content consumption devices 110, 130 may be digital TVs, laptop computers, smartphones, tablet computers, or the like. FIG. 3 shows a generalized embodiment of an illustrative user equipment device 300 that may serve as a content consumption device. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for receiving streamed content and executing its display, such as executing application programs that provide interfaces for content providers 140 to stream and display content.

Control circuitry 304 may thus include communications circuitry suitable for communicating with a content provider 140 server or other networks or servers. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be included. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Figure 4:
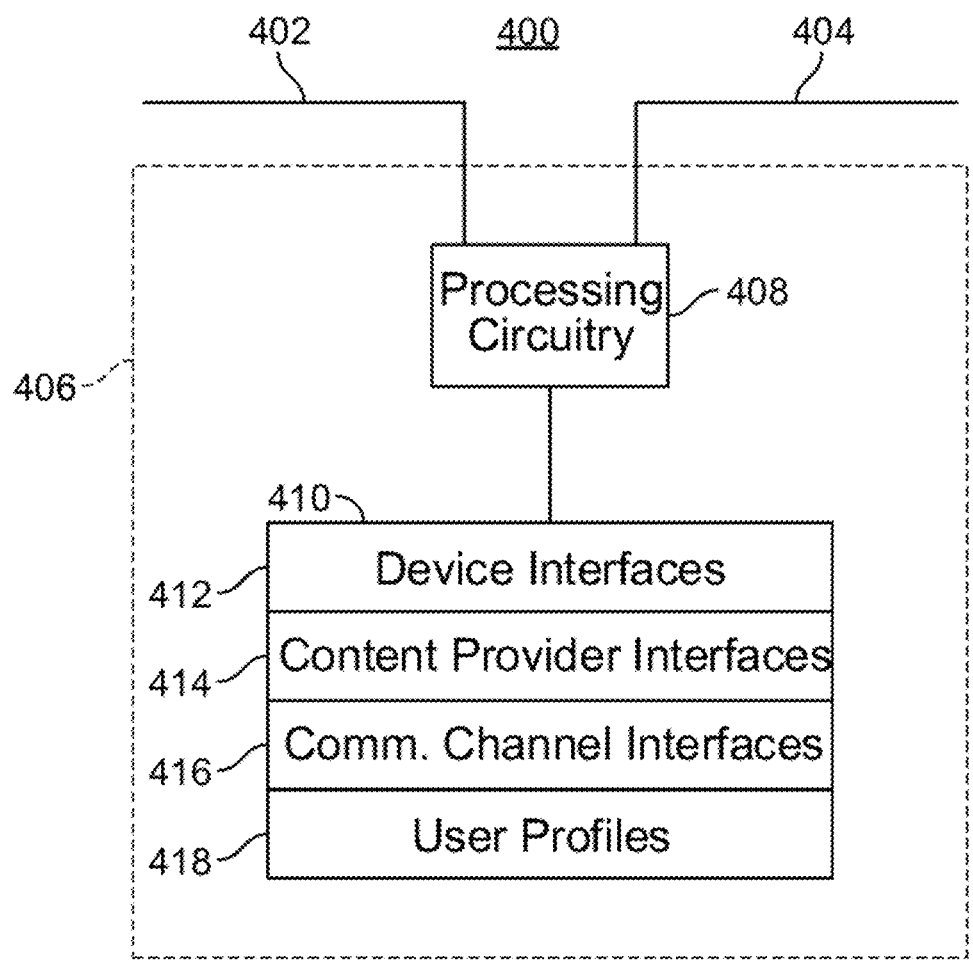
FIG. 4 is a generalized embodiment of an illustrative content direction device constructed for use according to embodiments of the disclosure.

FIG. 4 is a generalized embodiment of an illustrative content direction device 120 constructed for use according to embodiments of the disclosure. Here, device 400 may serve as a content direction device. Device 400 may receive content and data via I/O paths 402 and 404. I/O path 402 may provide content and data to the various content consumption devices 110 and 130, while I/O path 404 may provide data to, and receive content from, one or more content providers 140. Like the user equipment device 300, the device 400 has control circuitry 406 which includes processing circuitry 408 and storage 410. The control circuitry 406, processing circuitry 408, and storage 410 may be constructed, and may operate, in similar manner to the respective components of user equipment device 300.

Storage 410 is a memory that stores a number of programs for execution by processing circuitry 408. In particular, storage 410 may store a number of device interfaces 412, content provider interfaces 414, communication channel interfaces 416 for communicating with various applications that provide communication channels, and user profiles 418. The device interfaces 412 are interface programs for handling the exchange of commands and data with the various content consumption devices 110, 130. Content provider interfaces 414 are interface programs for handling the exchange of commands and content streams with various content providers 140, and are programmed to exchange commands and content similar to a corresponding application program on a content consumption device 110, 130. A separate interface 414 may exist for each different content provider 140 that has its own format for commands or content. Communication channel interfaces are interface programs for handling the exchange of commands and data with various communication channel application programs. A separate interface 416 may exist for each different communication channel application program that the content direction device 120 may interface with. User profiles 418 are stored user profiles corresponding to viewers or users of the content consumption devices 110, 130. User profiles 418 are known, and can contain favored content of their users. This favored content may be determined in any manner, such as by user entry of favored content they wish to hear when it is playing on others' nearby devices, automated determination of favored content from profiles of content the user has requested in the past, and the like. Content, including favored content, can also be any form of content, including audio content such as podcasts and e-books, video content such as videos, movies, audio and video content, and the like.

The device 400 may be any electronic device capable of receiving content streams and transferring them to one or more content consumption devices 110, 130. For example, the device 400 may be a networked in-home smart device connected between a home modem and various content consumption devices 110, 130. The device 400 may alternatively be a laptop computer or desktop computer configured as above.

Figure 5:
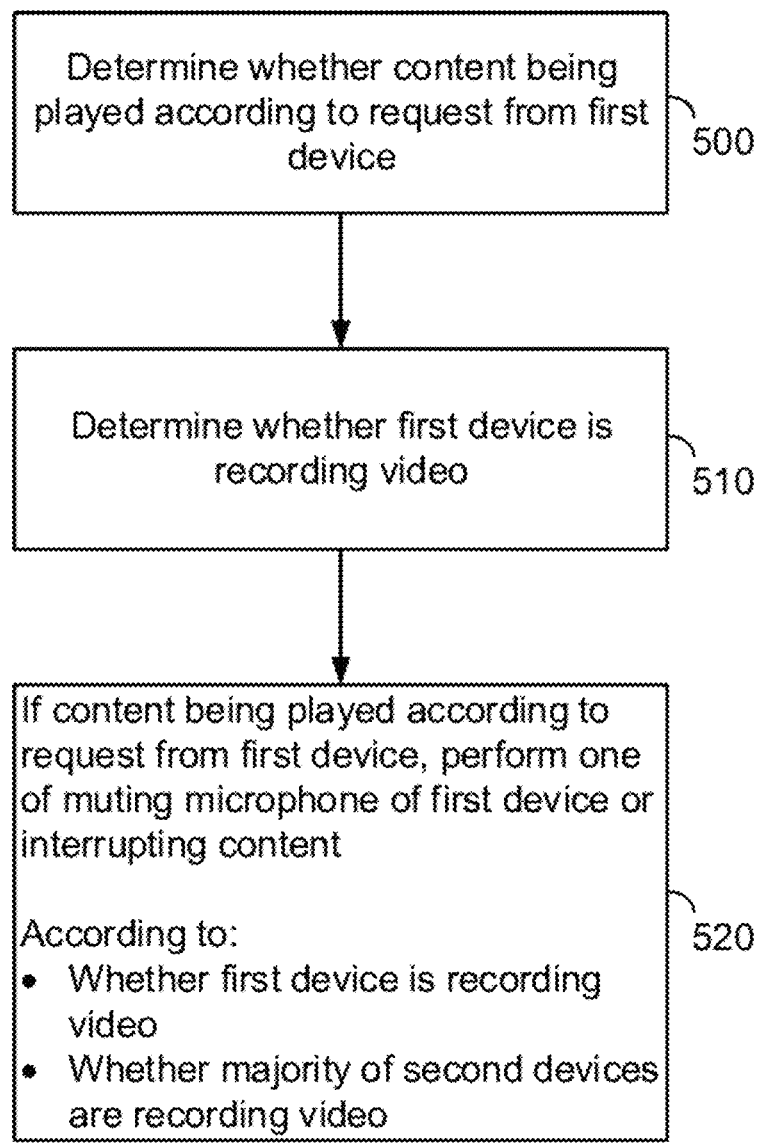
FIGS. 5 and 6 are flowcharts illustrating process steps for reducing interference from content play in multi-device environments, in accordance with embodiments of the disclosure.

FIG. 5 is a flowchart illustrating process steps for reducing interference from content play in multi-device environments, in accordance with embodiments of the disclosure. Initially, content direction device 50 determines whether content is currently being played according to a request from device 10 (Step 500). Here, the device directing play of content can be referred to as a first device. As above, this first device (e.g., device 10) can itself be transmitting content to content direction device 50, such as by streaming content stored in its local storage 308, or the first device can be directing content direction device 50 to retrieve content from a content provider 140 through, for example, communications network 210. Alternatively, a first device such as device 10 can be requesting play of content stored locally on content direction device 120 or on a peripheral device 220 in electronic communication with either content direction device 120 as shown in FIG. 2, or with the first device. Regardless of source location, content may be transmitted, such as streamed, to content direction device 120 where it is in turn transmitted to speakers 60 for play.

If content is being played according to Step 500, content direction device 50 then determines whether the first device, i.e., the device requesting play of content, is also currently recording video (Step 510). The content direction device 120 may, for example, query the first device whether its camera application is currently running and set to video mode. If content is being played through speakers 60, content direction device 120 performs one of muting the microphone of the content requesting device 10 or interrupting this content, according to whether the first device, or content requesting device such as device 10, is determined to be recording video and whether a majority of second devices, or other devices 20-40 in electronic communication with content direction device 120, are also determined to be recording video (Step 520).

Figure 6:
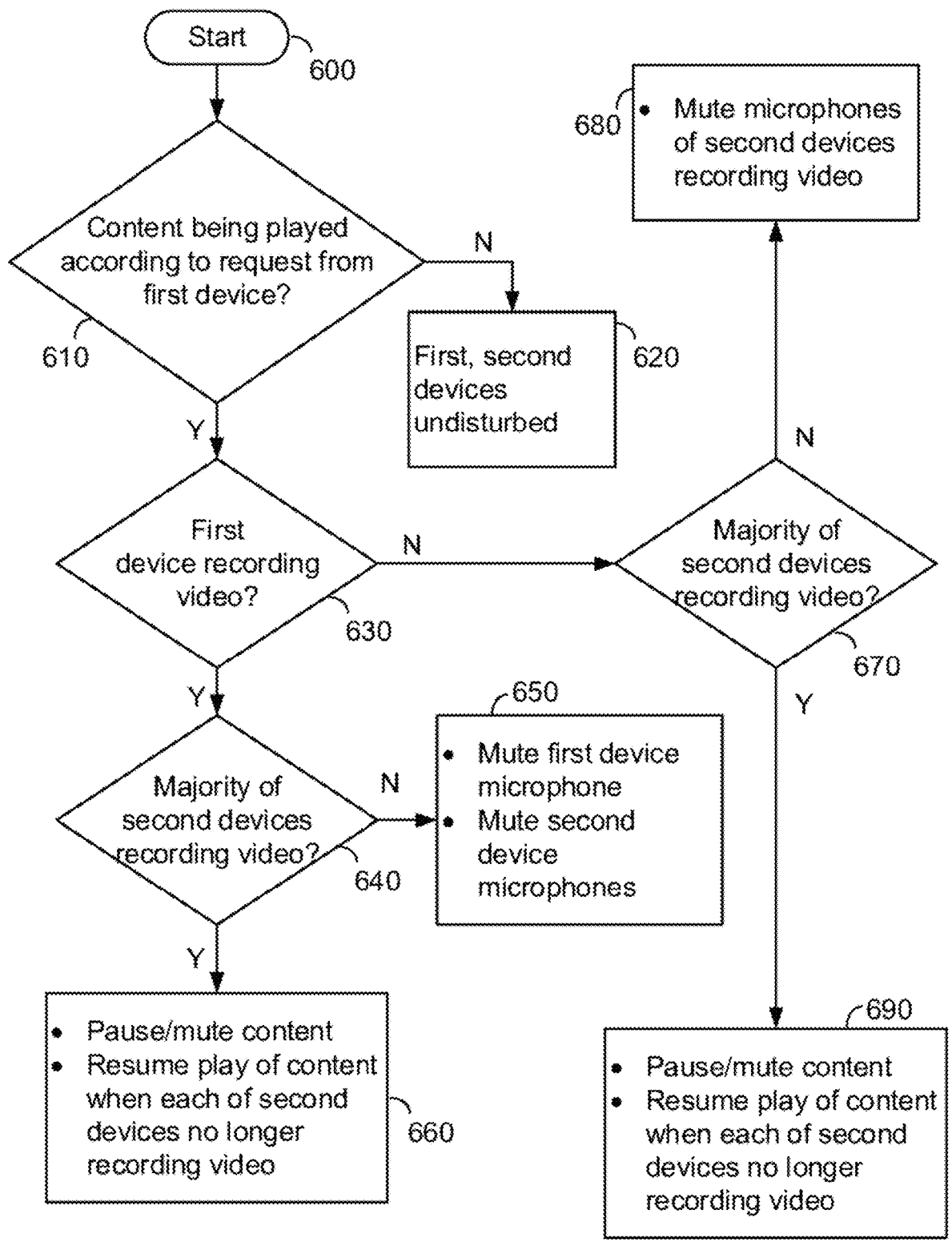

The conditions under which microphones are muted or content is interrupted are further detailed in connection with FIG. 6. The process of FIG. 6 begins (Step 600) with content direction device 120 determining whether content is being played to speakers 60 according to a request from the first device, e.g., device 10 (Step 610). If this is not the case, i.e., content direction device 120 is not currently transmitting content to speakers 60, then content direction device 120 does not disturb any of the devices 10-40 (Step 620). That is, content direction device 120 does not mute any microphone of any device 10-40.

If the content direction device 120 has received a request from the first device to play content to speakers 60 and is currently directing content to speakers 60 as a result, then content direction device 120 checks whether the first device is also recording video (Step 630), such as by querying the first device whether its camera application is running and in video mode.

If the first device returns an indicator to content direction device 120 that its camera application is active and in video mode, i.e., that it is currently taking video, the content direction device 120 then checks whether a majority of the second devices, or other devices 20-40 it is in communication with, are also recording video (Step 640). Content direction device 120 may perform this check for each second device in the same manner as for the first device. If a majority of the second devices 20-40 are also recording video, then the content direction device 120 interrupts content streaming to speakers 60 until each of the second devices 20-40 is no longer recording video, at which point content direction device 120 resumes streaming of content to speakers 60 (Step 660). In this case, an assumption is made that as the majority of devices in a location such as vehicle interior 70 are recording content, most users within vehicle interior 70 will wish content to be interrupted so that their video recordings do not pick up undesired sounds from content play. As a result, content direction device 120 interrupts content play from speakers 60. Here, interruption of content may include pausing content play, muting content play, or interrupting content play in any other manner while any device 20-40 is recording video.

Conversely, if less than a majority of second devices 20-40 are recording video, content direction device 120 does not interrupt content play to speakers 60, and instead mutes the microphone of the first device, i.e., device 10, along with the microphones of any of the second devices (devices 20-40) which are also recording video (Step 650). That is, it is assumed that most users will wish to continue listening to content from speakers 60, as most are not recording video. Accordingly, only those devices actually recording video have their microphones muted. Muting may continue as long as content is playing and second devices are recording video.

If at Step 630 the content direction device 120 determines that the first device 10 is not currently recording video, then the content direction device 120 determines whether a majority of second devices 20-40 are recording video (Step 670), as in Step 640. If a majority of second devices 20-40 are determined to be currently recording video, the content direction device interrupts play of content through speakers 60 and resumes content play when each of the second devices 20-40 are no longer recording video (Step 690), as in Step 660. Conversely, if less than a majority of second devices 20-40 are recording video, content direction device 120 mutes the microphones of those second devices 20-40 that are recording video (Step 680).

While the above disclosure illustrates devices 10-50 and their operation within a vehicle interior 70, it is noted that this vehicle may be any vehicle, such as a car, boat, plane, bus, truck, or any other mobile object that can carry multiple users and their devices. One of ordinary skill in the art will realize that devices 10-50 may be operated according to embodiments of the disclosure while being located within any enclosure or space besides that of a vehicle. For example, devices 10-50 may reside within a room or within a structure such as a dwelling or other building. In this manner, content direction device 50 may reduce audio interference in devices 20-40 that are located proximate to each other within any space. That is, content direction device 50 may act to reduce audio interference for any devices with which it is in electronic communication, regardless of location, environment, or setting.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, content may be retrieved and/or streamed from any source, including any device in communication with content direction device 120. Additionally, devices 10-50 may be located anywhere, whether within a vehicle, dwelling or other structure, or otherwise. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method comprising:
   receiving a request to record audio at a first device;
   determining whether a second device is playing audio in a vicinity of the first device; and
   in response to determining the second device is playing audio in the vicinity of the first device, performing the request to record audio at the first device, and, for a duration of the recording of the first device, at least one of muting of an audio output device operatively connected to the second device, or interrupting of play of content on the second device.

2. The method of claim 1, comprising:
   in response to determining the first device is no longer recording the audio, unmuting the audio output device operatively connected to the second device, or resuming play of the content on the second device.

3. The method of claim 1, wherein the determining whether the second device is playing audio in the vicinity of the first device includes determining whether the second device is both playing and recording in the vicinity of the first device; and
   in response to determining the second device is both playing and recording in the vicinity of the first device, pausing, for a duration of the recording of the second device, the request to record at the first device.

4. The method of claim 3, comprising:
   in response to determining the second device is no longer both playing and recording, performing the request to record audio at the first device.

5. The method of claim 1, wherein the determining whether the second device is playing audio in the vicinity of the first device is performed by a content direction device operatively connected to the first device and the second device.

6. The method of claim 5, wherein the content direction device is wirelessly connected to the first device, the audio output device, and the second device.

7. The method of claim 5, wherein each of the first device and the second device is at least one of a digital television, a laptop computer, a smartphone, or a tablet computer.

8. The method of claim 1, wherein the audio output device is not a part of the first device or the second device.

9. The method of claim 1, wherein the first device and the second device are positioned within a vehicle.

10. The method of claim 1, wherein the first device and the second device are positioned within a building.

11. A system comprising:
    circuitry configured to:
      receive a request to record audio at a first device;
      determine whether a second device is playing audio in a vicinity of the first device; and
      in response to determining the second device is playing audio in the vicinity of the first device, perform the request to record audio at the first device, and, for a duration of the recording of the first device, at least one of mute of an audio output device operatively connected to the second device, or interrupt of play of content on the second device.

12. The system of claim 11, wherein the circuitry is configured to:
    in response to determining the first device is no longer recording the audio, unmute the audio output device operatively connected to the second device, or resume play of the content on the second device.

13. The system of claim 11, wherein the determining whether the second device is playing audio in the vicinity of the first device includes determining whether the second device is both playing and recording in the vicinity of the first device; and the circuitry is configured to:
   in response to determining the second device is both playing and recording in the vicinity of the first device, pause, for a duration of the recording of the second device, the request to record at the first device.

14. The system of claim 13, wherein the circuitry is configured to:
   in response to determining the second device is no longer both playing and recording, perform the request to record audio at the first device.

15. The system of claim 11, wherein the determining whether the second device is playing audio in the vicinity of the first device is performed by a content direction device operatively connected to the first device and the second device.

16. The system of claim 15, wherein the content direction device is wirelessly connected to the first device, the audio output device, and the second device.

17. The system of claim 15, wherein each of the first device and the second device is at least one of a digital television, a laptop computer, a smartphone, or a tablet computer.

18. The system of claim 11, wherein the audio output device is not a part of the first device or the second device.

19. The system of claim 11, wherein the first device and the second device are positioned within a vehicle.

20. The system of claim 11, wherein the first device and the second device are positioned within a building.

* * * * *